United States Patent [19]
Tanaka et al.

[11] Patent Number: 4,802,049
[45] Date of Patent: Jan. 31, 1989

[54] DISC CARTRIDGE

[75] Inventors: Kimio Tanaka; Masaoki Sekine, both of Nagano, Japan

[73] Assignee: TDK Corporation, Japan

[21] Appl. No.: 10,894

[22] Filed: Feb. 4, 1987

[30] Foreign Application Priority Data

Feb. 10, 1986 [JP] Japan .............................. 61-16791[U]

[51] Int. Cl.4 ............................................. G11B 23/03
[52] U.S. Cl. ................................. 360/133; 360/99.06; 369/77.2
[58] Field of Search .................... 360/133, 132, 97–99; 206/444

[56] References Cited

U.S. PATENT DOCUMENTS 4,543,619  9/1985  Pastor ............................ 360/133 X
4,613,044  9/1986  Saito et al. ...................... 360/133 X
4,630,156  12/1986 Saito ................................... 360/133
4,697,216  9/1987  Tsukahara ............................ 360/97

Primary Examiner—John H. Wolff
Attorney, Agent, or Firm—Steinberg & Raskin

[57] ABSTRACT

A disc cartridge capable of readily accomplishing centering of a disc. The disc cartridge includes a casing which has a front end through which the disc cartridge is inserted into a disc player and a rear end which is opposite to the front end. At least the rear end is provided on an inner end surface thereof with an elastic means which acts to force the disc toward the front end to correctly position the disc in the casing when the disc cartridge is charged in a disc player.

18 Claims, 5 Drawing Sheets

DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in a recording and/or reproducing equipment such as a disc player.

Conventionally, such a disc type recording carrier has been desired to be protected from an environment because it is not only readily covered with dust and damaged but adversely affected due to a variation in temperature. For this purpose, the use of an envelope such as a tray, a casing or the like has been proposed to protect a disc. Unfortunately, such a conventional envelope is not effective to protect a double-sided hard disc, because the housing of the disc in a storage space defined in the envelope causes the disc to be contacted with the envelope. Also, the conventional disc cartridge has another disadvantage that when it is set in a disc player, centering of the disc fails. More particularly, the disc fails to be correctly positioned in the disc player or deviates from a correct position with respect to a disc driving element of the player such as a disc head, so that rapid operation of the disc cartridge may not be carried out. Further, the envelope causes the disc to contact an inner surface thereof during storage or transportation of the disc cartridge, resulting in not only the disc being damaged and polluted as well as exposed to a variation in temperature, but causing handling of the disc cartridge to be troublesome.

Accordingly, it would be highly desirable to provide a disc cartridge which is capable of readily carrying out centering of a disc with respect to a disc player and safely housing the disc in a casing without contacting a recording surface section of the disc directly with the casing.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. The casing has a first end or insertion side end through which the disc cartridge is inserted into a disc player and a second end or opposite end which is opposite to the insertion side end. The second end of the casing is provided on at least a part of an inner end surface thereof contacted by a peripheral portion of the disc, with elastic means which serve to force the disc toward the insertion side end of the casing.

Accordingly, it is an object of the present invention to provide a disc cartridge which is capable of carrying out rapid and smooth operation.

It is another object of the present invention to provide a disc cartridge which is capable of readily and rapidly accomplishing centering of a disc with respect to a disc player when the disc cartridge is inserted into the disc player.

It is a further object of the present invention to provide a disc cartridge which is capable of readily and rapidly correcting deviation of a center of a disc with respect to a disc player which occurs during transferring of the disc between a disc driving element of the disc player and a disc holding member of the disc cartridge.

It is still another object of the present invention to provide a disc cartridge which is capable of effectively preventing unsteadiness of a disc in a casing.

It is yet another object of the present invention to provide a disc cartridge which is capable of safely housing a disc in a casing without adversely affecting a recording surface section of the disc.

It is still a further object of the present invention to provide a disc cartridge which is capable of positively preventing damage and pollution of a disc to ensure satisfactory operation of the disc cartridge for a long period of time with high reliability.

It is yet a further object of the present invention to provide a disc cartridge which is capable of accomplishing the above-noted objects with a simple structure.

Still other objects and advantages of the invention will be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
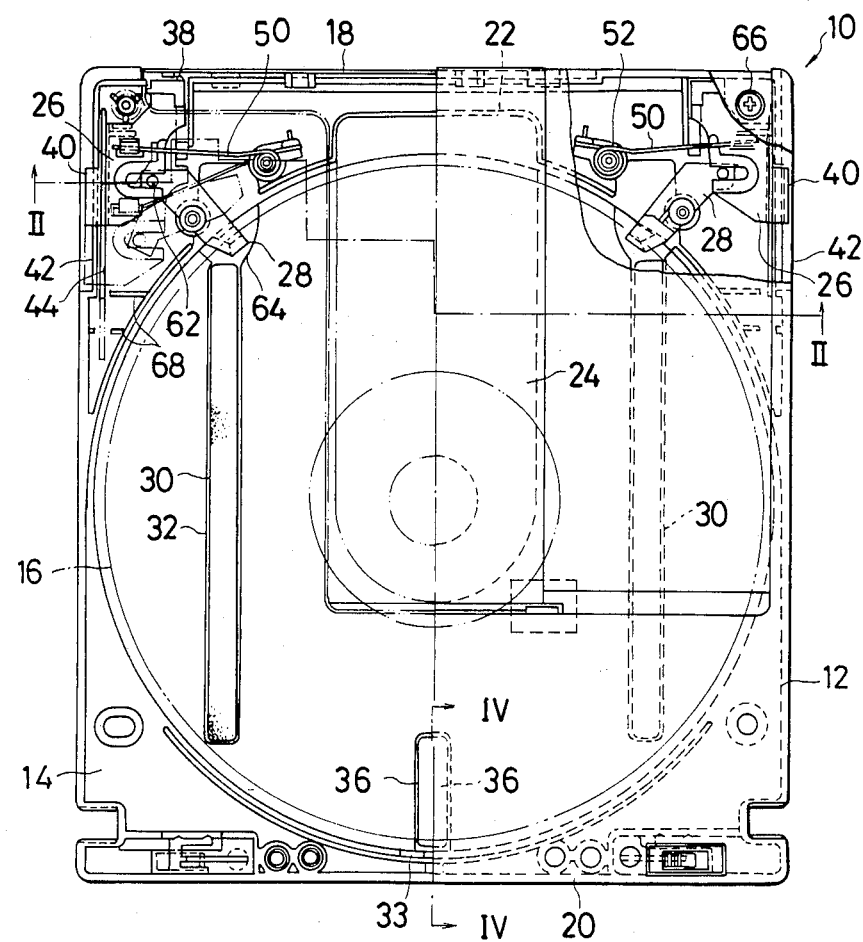
FIG. 1 is a partly cutaway plan view showing an embodiment of a disc cartridge according to the present invention.

FIG. 1 generally shows an embodiment of a disc cartridge according to the present invention.

Figure 2:
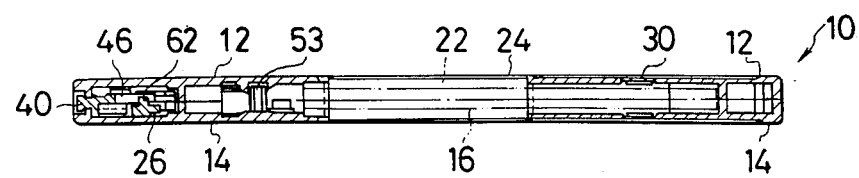
FIG. 2 is a sectional view taken along line II—II of FIG. 1.
Figure 3:
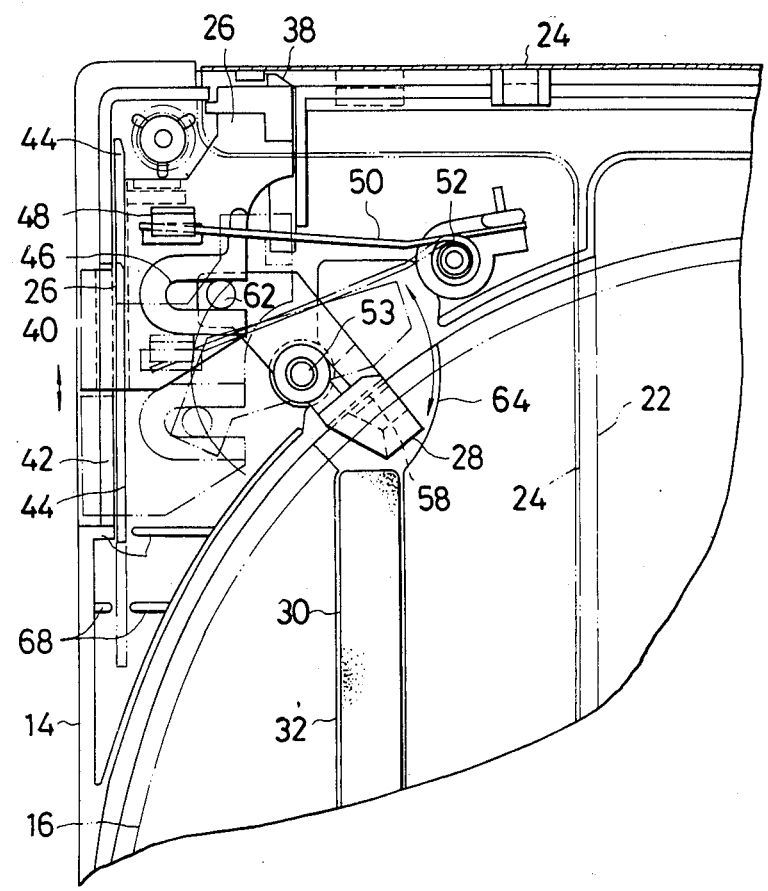
FIG. 3 is a fragmentary enlarged plan view showing an actuating section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 has a first end or insertion side end 18 through which the disc cartridge is inserted into a disc player (not shown) and a second end or opposite end 20 which is opposite to the insertion side end 18. In the illustrated embodiment, the insertion side end 18 is a front end and the opposite end 20 is a rear end. The casing 10 is formed with at least a window 22 for inserting a disc driving element (not shown) of the disc player such as a disc head therethrough into the casing 10. The window 22 is operated by a sliding member or shutter 24. Also, the disc cartridge includes a pair of actuators 26 arranged in the casing 10 for releasably locking the shutter 24 and a disc receiver 28 provided in the casing 10 and operatively connected to or engaged with each of the actuators 26. The disc receivers 28 each are adapted to selectively receive therein a part of a peripheral portion of the disc 16 or a part of each of upper, lower and peripheral end surfaces of the disc 16. The actuator 26 is arranged to be slidable in a longitudinal direction of the cartridge indicated by arrows in FIGS. 1 and 3, and the disc receiver 28 is adapted to be approachably moved with respect to the disc 16 when the actuator 26 is slidably moved; so that when the shutter 24 is actuated to close the window 22, the disc receiver 28 may be engaged with the disc 16 or insert therein a part of the disc to force it toward the second end or rear end 20 of the casing 10 while holding it at a center of the casing 10 along a thickness direction of the casing, to thereby keep it at a state of floating in the space defined in the casing 10, whereas when the shutter 24 is actuated to open the window 22, the disc receiver 28 may be disengaged from the disc 16 to prepare the disc for engagement with the disc driving element of the disc player which is then inserted through the opened window 22 into the cartridge.

In the disc cartridge of the illustrated embodiment, the upper cover plate 12 and lower cover plate 14 each are provided on an inner surface 29 (FIG. 4) thereof with at least a first disc holding member 30 as shown in FIG. 1, which is preferably arranged in a manner to somewhat project from the inner surface 29 of the cover plate. The first disc holding member 30 is positioned so as to be abutted against a non-recording surface section of the disc 16 such as a peripheral section thereof, a central section thereof or the like. In the illustrated embodiment, each of the cover plates 12 and 14 is provided with two such first disc holding members 30 so as to positionally correspond to a substantially peripheral section of the disc 16 and in a substantially symmetric manner, so that the disc 16 may be uniformly supported thereon; and each of the disc holding members 30 is arranged in a shallow recess 32 formed on the inner surface 29 of the cover plate. The disc holding member 30 may be formed of at least one material selected from the group consisting of ultra-high-molecular-weight polyethylene resin, ultra-high-molecular-weight polyethylene foam, graphite polytetrafluoroethylene, polyethylene terephthalate (PET) and polybuthylene terephthalate (PBT).

Figure 4:
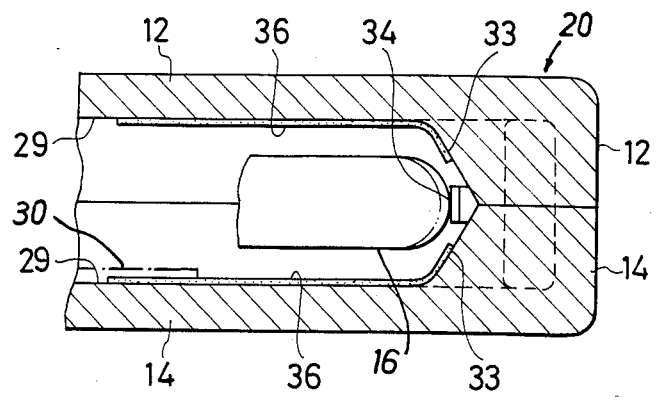
FIG. 4 is a fragmentary vertical sectional view taken along line IV-IV of FIG. 1.
Figure 5:
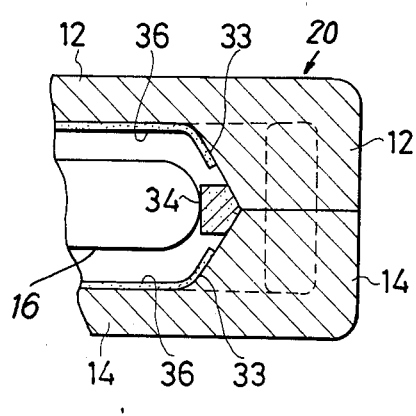
FIG. 5 is a fragmentary vertical sectional view showing modification of a spring means shown in FIG. 4.
Figure 6:
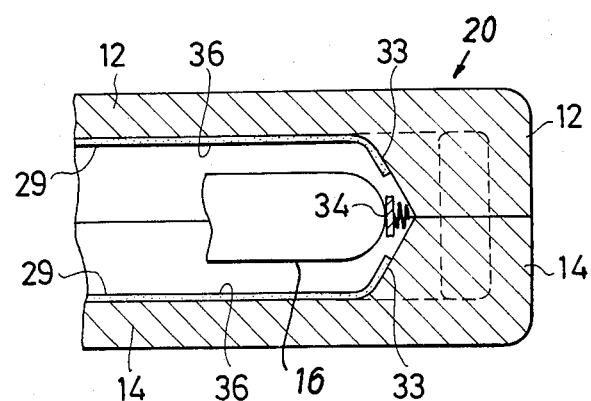
FIG. 6 is a fragmentary vertical sectional view showing another modification of spring means shown in FIG. 4.

Also, in the illustrated embodiment, the second end or rear end 20 opposite to the first end or insertion side end 18, as shown in FIG. 4, is provided on at least a part of an inner end surface 33 thereof contacted by a peripheral portion of the disc 16 with at least elastic means 34 which acts to force the disc 16 toward the insertion side direction 18 of the casing 10 to return it to its correct position, to thereby rapidly carry out centering of the disc with respect to the disc driving element of the disc player when the cartridge is charged in the disc player. The elastic means 34 shown in FIG. 4 comprises a leaf spring formed of a metal material. However, it may be formed of a flexible material which exhibits restoring force such as synthetic resin, foam or the like, as shown in FIG. 5. Alternatively, it may comprise a coiled spring and a plate member mounted on a tip end of the spring, as shown in FIG. 6. The elastic means 34 may be mounted on the inner surface 33 of the rear end 20 in a manner to somewhat project therefrom in an inward and horizontal direction. Also, the elastic means 34 may be provided on at least a central portion of the inner end surface 33 of the rear end 20. Alternatively, a plurality of such elastic means may be continuously or intermittently arranged in an arcuate shape and so as to positionally correspond to at least an outer periphery of the disc.

Further, in the illustrated embodiment, the rear end 20, as shown in FIGS. 4 to 6, may be formed into a substantially sideways V-shape, so that the inner end surface 33 may be tapered. In this instance, the elastic means is preferably mounted on a trough portion of the tapered inner end surface 33. Such construction facilitates positioning of the disc 16 at the center of the casing 10 in a thickness direction of the casing because it is guided along the tapered inner end surface 33. This results in the disc 16 being located at positions indicated at two-dot chain lines and solid lines in FIG. 4 when the disc cartridge is charged in the disc player and removed therefrom, respectively. Also, the tapered inner end surface 33 may have applied thereto a second disc holding member 36 of a sheet-like shape to ensure safety and smooth operation of the disc in the casing 10. For this purpose, the second disc holding member 36 is preferably formed of a material which is capable of exhibiting lubricating properties, such as ultra-high-molecular-weight polyethylene, ultra-high-molecular-weight polyethylene foam, polyethylene terephthalate (PET) or the like. Such a member likewise may be applied to portions of the inner surfaces 29 of the casing 10 adjacent to the tapered inner end surface 33 as shown in FIG. 4. When the second disc holding member 36 is formed of a material which is capable of exhibiting elastic properties as well as lubricating properties, it may be used also as the elastic means 34. In this instance, the second disc holding member is preferably arranged on the inner end surface so as to be contacted by the outer periphery of the disc as well as arranged in the manner described above. Such construction eliminates necessity of independently arranging the elastic means 34 on the inner end surface 33 of the rear end 20.

In the illustrated embodiment, the shutter 24 comprises a plate member of a substantially U-shape which is movably fitted on the casing 10 so as to be slidable along the upper and lower cover plates 12 and 14.

A pair of the actuators 26, as shown in FIG. 1, are formed to be symmetric and arranged adjacent to both sides of a front portion of the casing 10 in a manner to be not only opposite to each other but symmetric along a longitudinal axis of the cartridge and slidable with respect to the casing 10. Also, the actuators 26 each serve as an actuating lever to actuate operation sections of the disc cartridge. More particularly, each of the actuators 26, as shown in FIG. 3, is provided at a front end thereof with lock means 38, which comprises, in the illustrated embodiment, a hook-like member integrally formed at the front end of the actuator 26 and securely engaged with the shutter 24. The actuator 26 is also provided on one side or an outer side thereof with actuating means 40 which comprise, in the illustrated embodiment, a projection integrally formed on the outer side of the actuator and outwardly extending through a horizontally extending cutout or slot 42 formed at a side wall of the casing 10. Also, the actuator 26 has cover means 44 integrally mounted on the one side thereof so as to extend in a longitudinal direction thereof. The cover means 44 are formed to thoroughly cover the cutout 42 formed at the side wall of the casing 10 in a sealed manner to function as a dust protective cover for preventing any dust from entering the casing 10 through the cutout 42. In addition, the actuator 26 is formed on the other side or an inner side thereof with a guide groove 46 of a substantially U-shape which serves as movement transmission means for transmitting sliding movement of the actuator to the disc receiver 28 as described hereinafter. Further, the actuator 26 is provided on an upper surface thereof with a spring bearing 48 as shown in FIG. 3 which is engaged with one end of a spring 50 held at the other end thereof on a spring holder 52 fixed on the casing 10, so that the actuator may be constantly forced toward the front end 18 of the casing 10.

Figure 7:
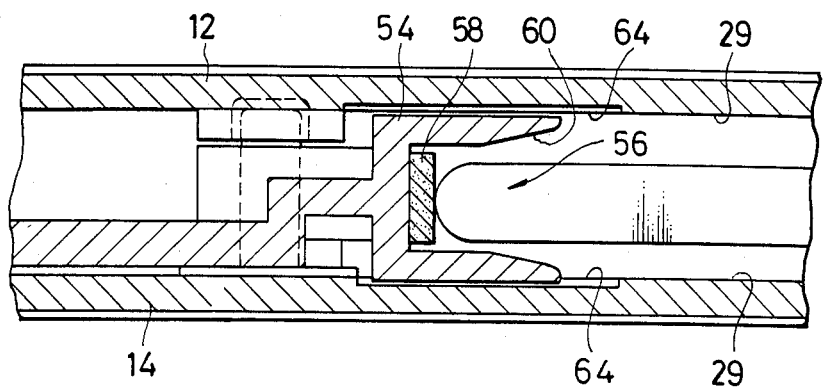
FIG. 7 is a fragmentary vertical sectional view showing a receiver body of a disc receiver.
Figure 8:
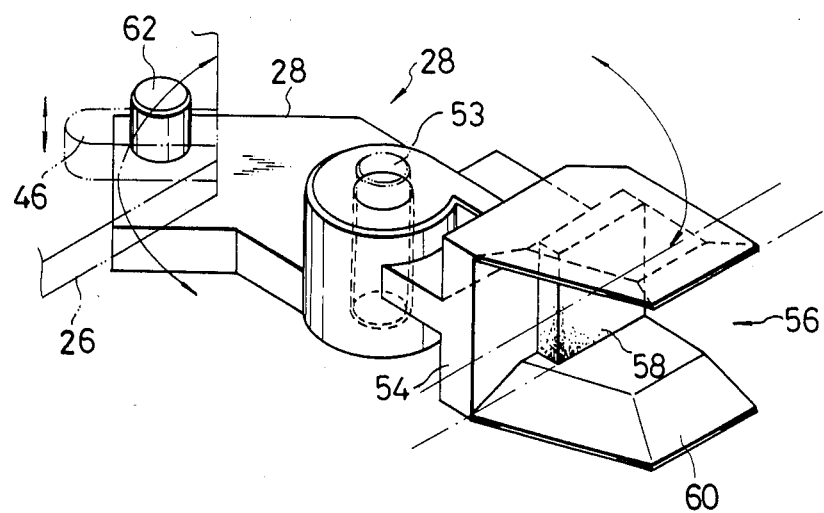
FIG. 8 is a perspective view showing a disc receiver.

A pair of the disc receivers 28, as shown in FIG. 1, are also formed in a manner to be symmetric. Each of the disc receivers 28 is generally formed into a lever-like shape as shown in FIGS. 1 and 3 and movably fitted at a middle thereof on a pivot pin 53 to cause the disc receiver 28 to be pivotally moved about the pivot pin 53 as shown in FIGS. 7 and 8. The disc receiver 28 is provided at one end thereof with a receiver body 54, which is formed into a substantially sideways U-shape to define therein a recess designated by reference numeral 56 in FIGS. 7 and 8. The recess 56 is provided on an end surface thereof which contacts with the peripheral end portion of the disc 16 with an elastic member 58 to prevent unsteadiness and/or damage of the disc in the disc receiver 24. Such an elastic member may be arranged on upper and lower surfaces of the recess 56. The elastic member 58 may be formed of rubber or a soft plastic material such as polyethylene, polypropylene, vinyl chloride or the like.

The recess 56 of the receiver body 54 is preferably formed in a manner such that its open end portion or inlet portion 60 is vertically enlarged so as to facilitate the insertion and removal of the disc 16 with respect to the recess 56.

The so-formed receiver body 54 is arranged to be positioned adjacent to the peripheral portion of the disc 16 to selectively receive a part of the peripheral portion in the recess 56 depending upon the sliding movement of the actuator 26 and also act s an elevator for lifting the disc 16. More particularly, the disc receiver 28, as best seen in FIG. 8, is also provided at the other end thereof with a guide pin 62 acting as operative connection means, which are loosely fitted in the guide groove 46 of the actuator 26 to operatively connect the disc receiver 28 to the actuator 26. In the illustrated embodiment, the guide pin 62 is provided at the disc receiver 28 and the guide groove 46 is formed at the actuator 26. However, the guide pin 62 and guide groove 46 may be provided at the actuator 26 and disc receiver 28, respectively.

Also, in the illustrated embodiment, the spring 50 may comprise a coiled spring stretchedly arranged in the sliding direction of the actuator 26 or between the disc receiver 28 operatively connected to the actuator 26 and the casing 10. Alternatively, it may comprise a coiled spring wound on the pivot pin 53 of the disc receiver 28. Each of such constructions causes the actuator 26 to be forced toward the front end 18 of the casing 10.

The casing 10, as shown in FIG. 1, is formed on each of upper and lower portions of the inner surface 29 thereof with a pair of recesses 64 so as to positionally correspond to the disc receivers 28. The recess 64 serves to ensure smooth pivotal movement of the disc receiver 28. Reference numerals 66 and 68 designate a bolt and a rib, respectively.

Now, the manner of operation of the disc cartridge of the illustrated embodiment constructed in the manner described above will be described hereinafter with reference to FIGS. 1 to 8.

When the disc cartridge is inserted in a disc player (not shown) for the operation, the actuating means or projection 40 of the actuator 26 projecting through the cutout 42 of each of the side plates of the casing 10 is engaged with a projection provided at an insertion port of the disc player to be rearwardly slided along the cutout 42 against the spring 50. The sliding of the projection 40 causes the shutter 24 to be released from the lock means or hook-like member 38, so that the shutter 24 may be moved in a direction of opening the window 22 by means of a shutter actuating mechanism of the disc player. Concurrently, the disc receiver 28 is pivotally moved about the pivot pin 53 to the sliding of the actuator 26 to release the disc 16 from the recess 56, resulting in the disc 16 being safely supported on the first disc holding members 30 and then operatively engaged with a disc driving element of the disc player. In this instance, the disc 16 abuts at a part of the periphery thereof against the elastic means 34 before it is contacted by the inner end surface 33 of the rear end 20 of the casing 10, so that the disc may be rapidly returned to its original position in the casing or centering of the disc with respect to the disc driving element of the disc player may be readily carried out.

When, the disc cartridge is to be removed from the disc player, the disc 16 is first disengaged from the disc driving element of the disc player to be put on the disc holding member 30 and then the shutter 24 is moved by means of the shutter actuating mechanism of the disc player to close the window 22. Then, the disc cartridge is removed from the disc player, so that the actuator 26 may be slided toward the front end 18 of the disc cartridge by means of the spring 50 to actuate the disc receiver 28, to thereby fit a part of the disc 16 in the receiver body 54. This results in the disc 16 being forced toward the rear end 20 of the casing 10 while being held at a state of floating in the space in the casing 10. Simultaneously, the lock means 38 of the actuator 26 actuate to keep the shutter 24 closed. Thus, the disc 16 is constantly held at a safe state in the casing 10 because a recording surface section of the disc is prevented from being contacted directly by the casing.

As can be seen from the foregoing, in the disc cartridge of the present invention, the casing is provided on at least a part of the inner end surface of the opposite end which is opposite to the insertion side end thereof with the elastic means for forcing the disc toward the insertion side end to return it to its correct position, so that centering of the disc with respect to a disc driving element of a disc player may be readily carried out and deviation of the disc which occurs during transferring of the disc between the disc driving element and the disc holding member may be readily corrected. Also, such construction effectively prevents unsteadiness of the disc in the casing. Further, the present invention holds the disc at a state of floating in the casing without directly contacting the recording surface section of the disc with the inner surface of the casing when the disc cartridge is not used. Thus, the present invention ensures safe operation of the disc in the casing for a long period of time with high reliability.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising;
   a casing comprising an upper cover plate and a lower cover plate joined together to define a spacing in said casing;
   said casing being provided with an insertion or front side end through which said disc cartridge is inserted into a disc player and a rear end which is opposite to said insertion side end;
   a disc housed in said casing;
   a shutter for operating at least one window provided in said casing to insert a disc driving element of the disc player therethrough into said casing; and
   at least one elastic means mounted on at least a part of an inner end surface of said opposite or rear end of said casing to force said disc toward said insertion side end to correctly position said disc in said casing.

2. A disc cartridge as defined in claim 1, wherein said insertion side end and opposite end are a front end and a rear end of said casing, respectively.

3. A disc cartridge as defined in claim 1, wherein said elastic means comprise a leaf spring.

4. A disc cartridge as defined in claim 1, wherein said elastic means are formed of a flexible material which exhibits restoring force.

5. A disc cartridge as defined in claim 4, wherein said flexible material is selected from the group consisting of rubber, synthetic resin and foam.

6. The cartridge of claim 5, wherein said rubber, synthetic resin and foam include ultra-high molecular weight polyethylene, ultra-high-molecular-weight polyethylene foam, and polyethylene terephthalate.

7. A disc cartridge as defined in claim 1, wherein said elastic means comprise a coiled spring and a plate member mounted on a distal end of said coiled spring.

8. A disc cartridge as defined in claim 1, wherein said opposite end is formed into a substantially sideways V-shape to cause said inner end surface to be tapered.

9. A disc cartridge as defined in claim 8, wherein said elastic means is provided at a trough portion of said tapered inner end surface.

10. A disc cartridge as defined in claim 9, wherein said elastic means are formed of a sheet-like material which exhibits lubricating and elastic properties and applied to said tapered inner end surface.

11. The cartridge of claim 8, additionally comprising at least one disc holding member of sheet-like shape applied to at least a portion of said tapered inner end surface.

12. The cartridge of claim 11, wherein said at least one disc holding member is additionally applied onto a portion of an inner surface defining said space within said casing, which is adjacent to said tapered end surface.

13. The cartridge of claim 12 additionally comprising two said disc holding members, each being applied onto a respective inner surface of said upper or lower cover plate defining said spacing, and each extending at least partially onto a respective leg of said substantially V-shaped end.

14. The cartridge of claim 13, wherein said disc holding members are formed of a material which is capable of exhibiting lubricating properties, including ultra-high-molecular-weight polyethylene, ultra-molecular-weight polyethylene foam, and polyethylene terephthalate.

15. A disc cartridge as defined in claim 1, wherein a plurality of said elastic means are intermittently arranged on said inner end surface.

16. A disc cartridge as defined in claim 1, wherein a plurality of said elastic means are continuously arranged on said inner end surface.

17. The cartridge of claim 1, wherein said elastic means are mounted to project from said opposite rear end in a direction toward said insertion side.

18. The cartridge of claim 1, wherein said elastic means are provided at least on a substantially central portion of said inner surface of said opposite or rear end.

* * * * *